United States Patent
Segel

(10) Patent No.: US 11,617,310 B1
(45) Date of Patent: Apr. 4, 2023

(54) MODULAR FLOWER WALLS

(71) Applicant: Nicol Floral Design LLC, Newtown Square, PA (US)

(72) Inventor: Xavier Segel, Newtown Square, PA (US)

(73) Assignee: Nicol Floral Design LLC, Newtown Square, PA (US)

( * ) Notice: Subject to any disclaimer, the term of this patent is extended or adjusted under 35 U.S.C. 154(b) by 0 days.

(21) Appl. No.: 17/687,903

(22) Filed: Mar. 7, 2022

(51) Int. Cl.
*A01G 9/02* (2018.01)
*E04B 2/72* (2006.01)

(52) U.S. Cl.
CPC ............... *A01G 9/025* (2013.01); *E04B 2/72* (2013.01)

(58) Field of Classification Search
CPC .............. A01G 9/02; A01G 9/021–025; E04B 2/8658; E04B 2/8652; E04B 2/72
See application file for complete search history.

(56) References Cited

U.S. PATENT DOCUMENTS

| | | | | |
|---|---|---|---|---|
| 2002/0104264 | A1* | 8/2002 | Chick | A01G 9/025 52/173.1 |
| 2006/0156624 | A1* | 7/2006 | Roy | A01G 31/02 47/62 R |
| 2011/0225883 | A1* | 9/2011 | Clifford | A01G 9/033 47/82 |

FOREIGN PATENT DOCUMENTS

| | | | | | |
|---|---|---|---|---|---|
| CN | 107980416 | A | * | 5/2018 | |
| FR | 2634971 | A1 | * | 2/1990 | |
| FR | 2906822 | A1 | * | 4/2008 | ............ A01G 9/025 |
| FR | 2955736 | A1 | * | 8/2011 | ............ A01G 9/025 |
| FR | 3113555 | A1 | * | 3/2022 | |
| GB | 2538960 | A | * | 12/2016 | ............ A01G 9/025 |
| GB | 2543342 | A | * | 4/2017 | ............ A01G 9/025 |
| KR | 20150005116 | A | * | 1/2015 | |
| KR | 20160017859 | A | * | 2/2016 | |
| KR | 2016022448 | A | * | 3/2016 | ........... A01G 27/008 |
| KR | 20160022448 | A | * | 3/2016 | |
| KR | 20160097825 | A | * | 8/2016 | |
| KR | 101656516 | B1 | * | 9/2016 | |
| KR | 20170001523 | A | * | 1/2017 | |
| KR | 20170041050 | A | * | 4/2017 | |
| KR | 1733235 | B1 | * | 5/2017 | ............ A01G 9/022 |
| KR | 101733235 | B1 | * | 5/2017 | |
| KR | 102340390 | B1 | * | 12/2021 | |
| KR | 20210148814 | A | * | 12/2021 | |
| KR | 20220003278 | A | * | 1/2022 | |
| WO | WO-2013014337 | A2 | * | 1/2013 | ............... A01G 9/02 |

* cited by examiner

*Primary Examiner* — Babajide A Demuren
(74) *Attorney, Agent, or Firm* — Gearhart Law LLC

(57) ABSTRACT

The present invention is a modular wall including a base and a support structure. The support structure is secured to the base with retractable supports. The support structure may be removed from the base, allowing a user to easily move the wall in separate parts. Furthermore, the modular wall includes a decorative panel held up by the support structure. The decorative panel may have flowers attached creating a wall of flowers, or a painted-on decoration. More than one modular wall may be used together to create a wider decorative wall.

16 Claims, 7 Drawing Sheets

MODULAR FLOWER WALLS

CLAIM OF PRIORITY

This application is a non-provisional application and, therefore, claims no priority to any previous patent or patent application.

FIELD OF THE EMBODIMENTS

The field of the present invention and its embodiments relate to a modular decorative wall with a removable decorative panel that attaches to a support structure that is supported by a base.

BACKGROUND OF THE EMBODIMENTS

With the rise of social media and smartphones, more and more pictures are being taken at events, such as weddings, office holiday parties, and birthday parties. However, not every venue has a view worthy of the background for a picture. The venues that do, it is usually a decorative wall or outdoor foliage that cannot be moved.

A perfect background, such as flowers, could easily be relocated if attached to a modular wall. Modular walls allow a user to disassemble the wall structure into multiple pieces. This allows each piece of the wall to be moved separately, thereby reducing the weight needed to be carried at once. This also allows the wall to be separated to fit through doorways, or hallways that it may not normally be able to fit through in one piece. Legacy solutions attempt to provide a wall that can be easily disassembled, but fails to provide aesthetic structure, or decoration that creates the perfect background for a photo. Examples of modular walls are provided below.

For instance, US 2007/0175108A1 pertains to a system that includes injection molded wall panels, corner posts, and doors having integrated connectors that combine to form a family of variously sized wall assemblies and door assemblies for utility enclosures.

US2017/0191262A1 pertains to a low-density, highly insulating modular panel for use in many applications and industries. The panel has a frame that may be preformed or bent and may be made of rigid or flexible material, and a panel covering comprising at least one pocket of thin, low-density shade fabric that has the capability of sufficiently stretching to surround the frame when the pocket is pulled onto it.

US2018/0073244A1 pertains to a modular wall comprising at least two wall panels, each comprising first and second vertical edges, a top edge, and a bottom edge. A leg is connectable to a wall panel, configured to apply a vertical force on the wall panel.

US2021/0123242 pertains to a modular wall panel including a backer board and a plurality of from boards arranged in a plurality of rows.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

In one aspect of the present application, a modular wall includes: a base, including a base panel, sidewalls and at least two support channels, with the sidewalls being coupled to the base panel, where the base panel and the sidewalls define a recess, and where the at least two support channels are located within the recess, a support structure, includes a top board, at least two side boards, and at least two support bars, each of the at least two side boards further includes a top end, a bottom end, and an inner surface, where the top end of each of the at least two side boards is coupled to the top board, and where the at least two support bars are coupled to the inner surface of the side boards, and a wall panel, coupled to the support structure, where the support bars of the support structure are configured to engage the at least two support channels of the base.

The modular wall may also include where each of the side boards of the support structure further comprise a support channel.

The modular wall may also include a panel removably coupled to the support structure. Other technical features may be readily apparent to one skilled in the art from the following figures, descriptions, and claims.

In another aspect of the present application, a modular wall includes a base, includes a base panel, sidewalls and at least two support channels, with the sidewalls being coupled to the base panel, where the base panel and the sidewalls define a recess, and where the at least two support channels are located within the recess, a support structure, includes a top board, at least two side boards, and at least two support bars, with each of the at least two side boards further includes a top end, a bottom end, and an inner surface, where the top end of each of the at least two side boards is coupled to the top board, and where the at least two support bars coupled to the inner surface of the side boards, a panel, removably coupled to the support structure, and a wall panel, coupled to the support structure, where the support bars of the support structure are configured to engage the at least two support channels of the base.

The modular wall may also include where the panel includes, a decoration, a front, and a back, the back of the panel is configured to engage to the wall panel, and the decoration is coupled to the front of the panel. Other technical features may be readily apparent to one skilled in the art from the following figures, descriptions, and claims.

In yet another aspect of the present application, a modular wall includes a base, includes a base panel, sidewalls and at least two support channels, with the sidewalls being coupled to the base panel, where the base panel and the sidewalls define a recess, and where the at least two support channels are located within the recess, a support structure, includes a top board, at least two side boards, at least two support bars, and an attachment channel coupled to the top board, with each of the at least two side boards further includes a top end, a bottom end, an inner surface and a support channel, where the top end of each of the at least two side boards is coupled to the top board, and where the at least two support bars are coupled to the inner surface of the side boards, where each of the side boards of the support structure further comprise a securement mechanism configured to secure the support bars, and the support bars configured to slidably engage the support channels, a panel having, a complimentary attachment mechanism designed to removably couple to the attachment channel of the support structure, flowers, a front, and a back, the back of the panel is configured to engage to the wall panel, and the flowers are coupled to the front of the panel, and a wall panel, coupled to the support structure, where the support bars of the support structure are configured to engage the at least two support channels of the base.

The modular wall may also include where each of the side boards of the support structure further comprise a securement mechanism configured to secure the support bars of the support structure.

The modular wall may also include where the panel includes a decoration, a front, and a back, the back of the panel is configured to engage to the wall panel, and the decoration coupled to the front of the panel.

The modular wall may also include where the decoration of the panel is flowers.

The modular wall may also include where the support structure further includes an attachment channel coupled to the top board of the support structure, and the panel includes a complimentary attachment mechanism configured to removably couple to the attachment channel of support structure.

The modular wall may also include where the at least two support bars of the support structure are configured to slidably engage the support channels of the side boards.

The modular wall may also include where each of the side boards of the support structure further comprise a securement mechanism configured to secure the support bars of the support structure. Other technical features may be readily apparent to one skilled in the art from the following figures, descriptions, and claims.

It is an object of the present invention to provide a modular wall that supports a decorative panel.

It is an object of the present invention to provide a modular wall that supports a decorative panel made of flowers.

It is an object of the present invention to provide a modular wall with a decorative panel that removably attaches to the support structure It is an object of the present invention to provide a modular wall with support bars that can retract into the support structure.

It is an object of the present invention to provide a modular wall to be used with multiple modular walls of the present invention, in order to make a wider modular wall.

It is an object of the present invention to provide a modular wall for use as a decorative background, for wedding or other events.

DETAILED DESCRIPTION OF THE EMBODIMENTS

Figure 1A:
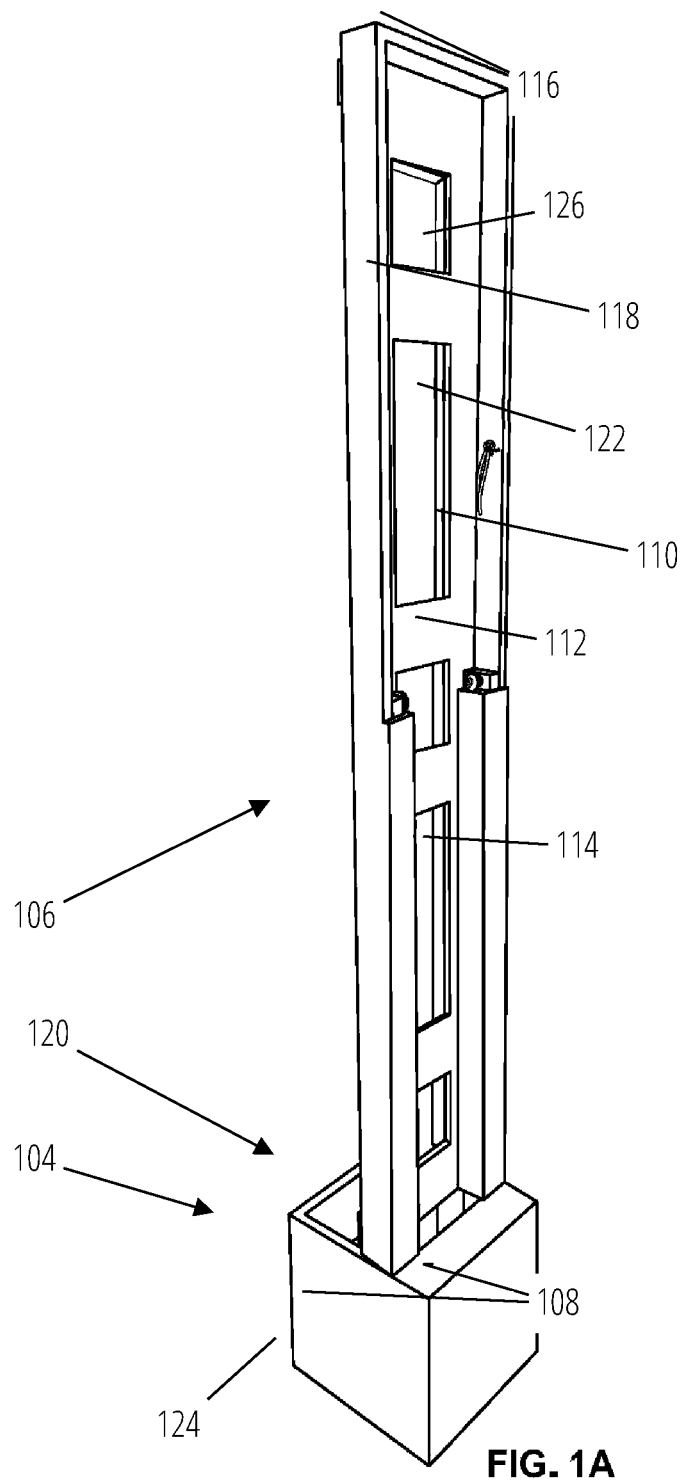
FIG. 1A shows an auxiliary view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited hereto. In fact, those of ordinary skill in the art may appreciate upon reading the present specification and viewing the present drawings that various modifications and variations can be made thereto.

FIG. 1A shows a modular wall 102. The modular wall 102 may include at least three primary components, a base 104, a support structure 106, and a wall panel 118. The base 104 may further include sidewalls 108 and a base panel 124. The sidewalls 108 and the base panel 124 may be made of wood, metal, plastic, or any other rigid material. The sidewalls 108 may be attached to the base panel 124 to form the base 104, where the base panel 124 defines the bottom of the base 104, and the sidewalls 108 may be connected to the base panel 124 to form the sides of the base 104. In the preferred embodiment, the base 104 is a cube shape. In other embodiments, the base 104 may be a rectangular prism shape, a triangular prism, a cylinder, or any other prism shape. It is to be appreciated that the sidewalls 108 may be connected to the base panel 124 by glue, nails, screws, or any other securement mechanism. The face of the base 104 opposite the base panel 124 may be open whereby the sidewalls 108 and base panel 124 define a recess 120.

The support structure 106 may include a top board 116, at least two side boards 110. In the preferred embodiment, the top board 116 may be the width of the base 104. In other embodiments, the top board 116 may be shorter than the width of the base 104, or the top board 116 may be longer than the width of the base 104. In the preferred embodiment, the side boards 110 and top board 116, may be made of wood, plastic, metal, or any other rigid material. In the preferred embodiment, one end of each of the side boards 110 may be attached to the top board 116 at a right angle, thereby creating a rectangular support structure 106. In another embodiment, the side boards 110 may be attached to the top board 116 at an angle less than a right angle. In another embodiment, the side boards 110 may be attached to the top board 116 at an angle greater than a right angle. In other embodiments, the support structure 106 may be a square, trapezoid, or other shape.

The wall panel 118 may be made of flat plywood, plastic, metal, or any other rigid material. For example, in the preferred embodiment, the wall panel 118 may be a flat piece of plywood, the same dimensions as the support structure 106. In another embodiment, the wall panel 118 may be smaller than the dimensions of the support structure 106. In a further embodiment, the wall panel 118 may be larger than the dimensions of the support structure 106. The wall panel 118 may be attached to the support structure 106 so it provides further support along the length of the side boards 110. In one embodiment, the wall panel 118 may have at least one hole cut into it, thereby reducing the weight of wall panel 118, and the modular wall 102.

In one embodiment, the support structure 106 may include at least two support bars 112 attached to an inner surface 126 of each of the at least two side boards 110. In the preferred embodiment, the support bars 112 may be the same height as the height of the base 104. In another embodiment, the support bar 112 may be taller than the height of the base 104. In another embodiment, the support bars 112 may be shorter than the height of the base 104. The support bars 112 may be attached to the side boards 110 near the end of the side boards 110 opposite the top board 116. The at least two support bars 112 may be designed to secure the support structure 106 to the base 104.

In another embodiment, the side boards 110 may each include a support channel 114. The support channels 114 may be the same length as the support bars 112. The support channels 114 may be attached to the inner surface 126 of the side boards 110. The support channels 114 may be designed to secure the support bars 112 to the side boards 110. The support bars 112 may be designed to slide into the support channels 114 such that the support bars 112 do not extend beyond the side boards 110. In this embodiment, a user may slide the support bars 112 into the support channels 114, so the support bars 112 are in a retracted state and do not secure the support structure 106 to the base 104. The support structure 106 may be removed from the base 104 without the support bars 112 being in the way.

Figure 1B:
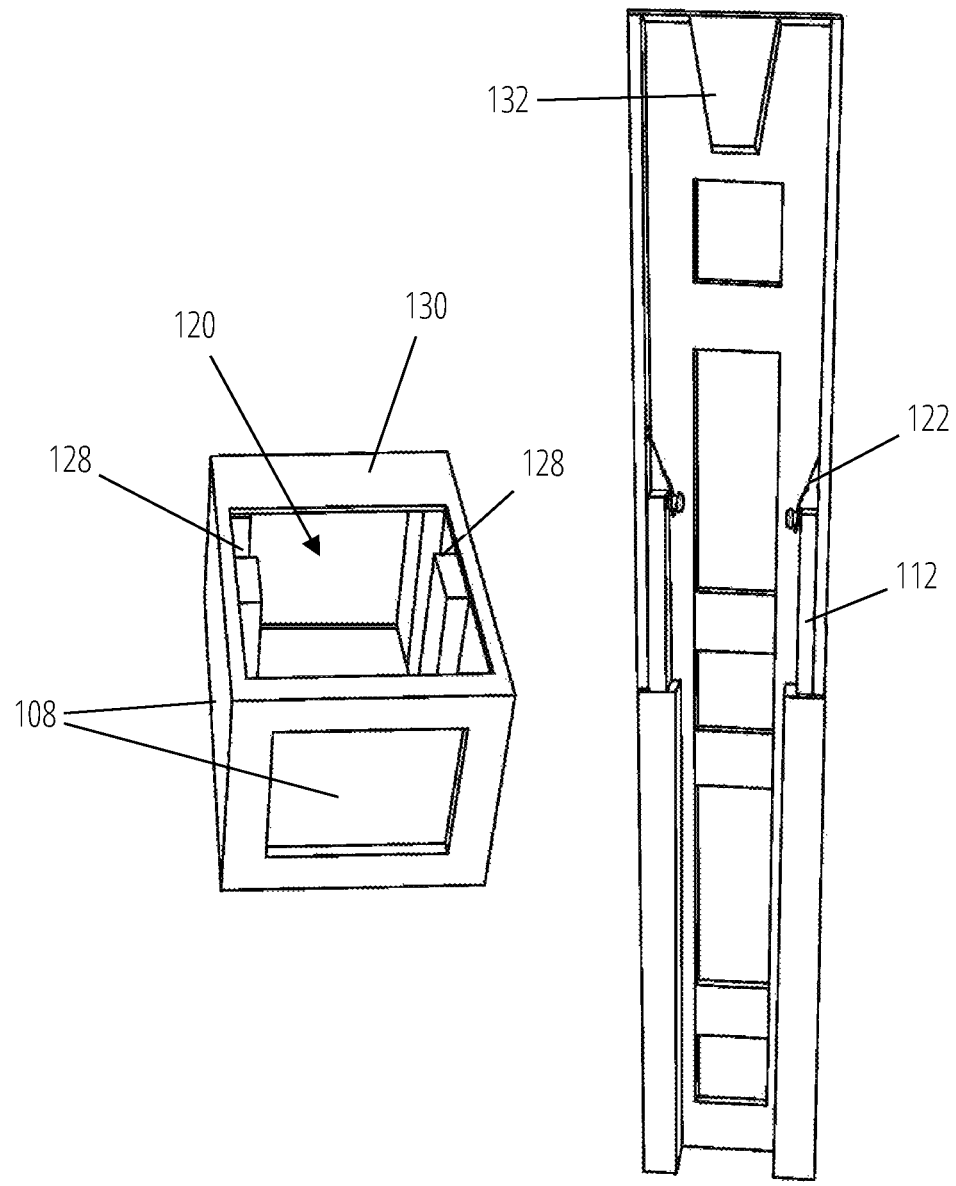
FIG. 1B shows an exploded view of an embodiment of the present invention.

FIG. 1B shows the modular wall 102 with the support structure 106 separated from the base 104. The base 104 may also include at least two support channels 128. The support channels 128 may be designed to secure the support bars 112 to the base 104. The support channels 128 may be in the recess 120 and attached to opposing sidewalls 108. The support channels 128 may provide a force on the support bars 112 keeping the support bars 112 upright, thereby keeping the support structure 106 upright when it is attached to the base 104. In the preferred embodiment, the support channels 128 may be the same size as the support bars 112. In another embodiment, the resulting support channels 128 may be longer and wider than the support bars 112. When the support bars 112 are in a retracted state, the support bars 112 do not engage the support channels 128, thereby allowing a user to easily remove the support structure 106 from the base 104. It is to be appreciated that the support channels 128 may be made out of wood, plastic, metal, or any other rigid material.

The base 104 may also include a top panel 130 attached to the top of the sidewalls 108. The top panel 130 may be a flat rectangular piece of wood, metal, plastic, or other rigid material. The top panel 130 may be designed to cover a part of the recess 120 extending from the front of the base 104 to the support channels 128, so the recess 120 is hidden, when viewed from the front of the base 104, when the support structure 106 is attached to the base 104. In one embodiment, the top panel 130 covers the entire recess 120 except for openings the same size as the support channels 128. In this embodiment, the entire recess 120 is hidden from view when the support structure 106 is attached to the base 104. In other embodiments, the openings may be larger than the size of the support channels 128.

Figure 2:
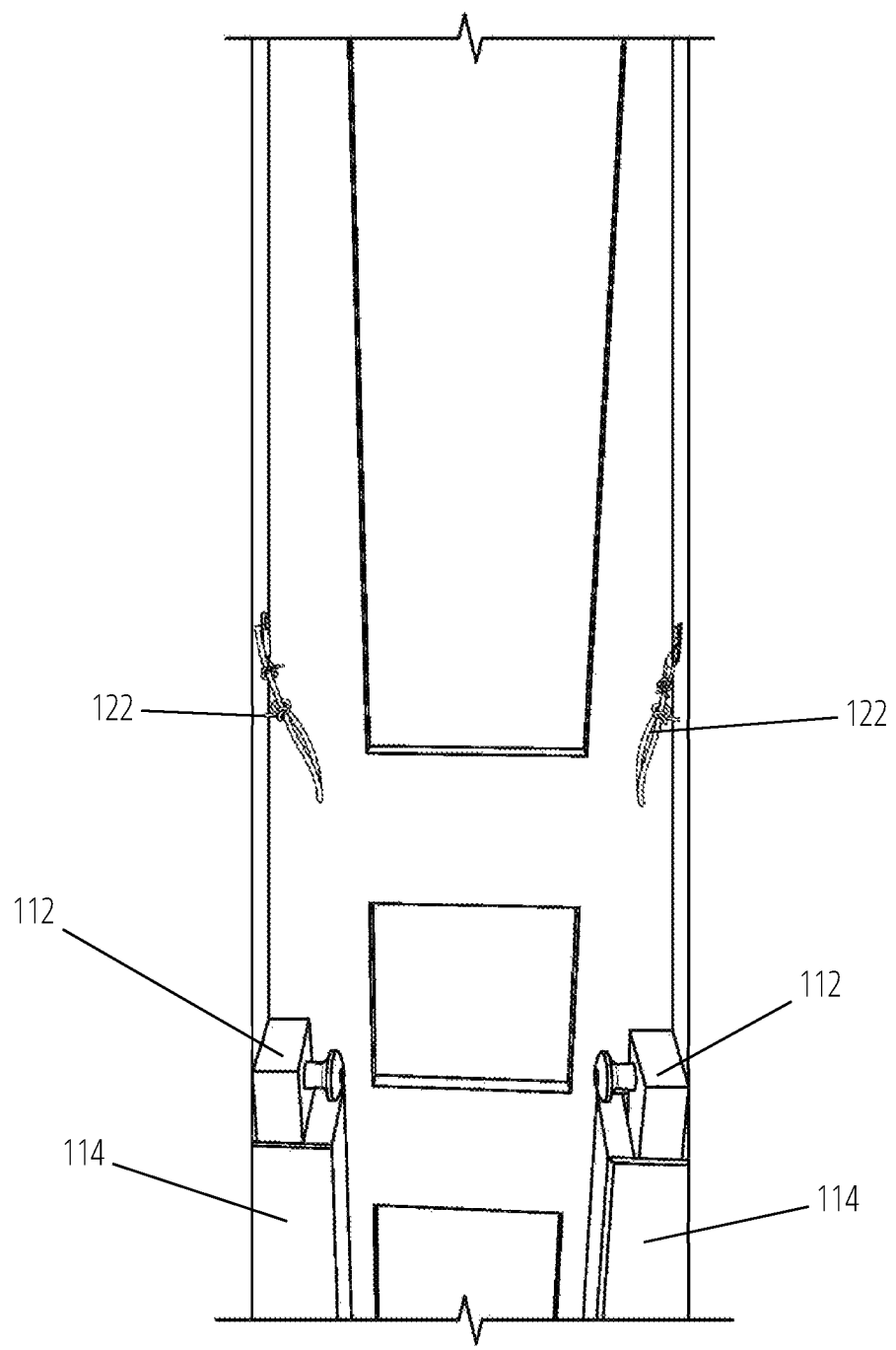
FIG. 2 shows a back view of a support structure of the present invention.

FIG. 2 shows a close-up of the securement mechanisms 122. In order to keep the support bars 112 in a retracted state, the support structure 106 may also include securement mechanisms 122 attached to the inner surface 126 of each of the side boards 110. In the preferred embodiment, the securement mechanisms 122 may be a length of material that attaches to a knob on each of the support bars 112. In the preferred embodiment, the material may be string. In other embodiments, the material may be rope, twine, leather, or other length of material. In another embodiment, the securement mechanism 122 may be a pin that inserts into a hole cut in the support bars 112 and the side boards 110, thereby keeping the support bars 112 in a retracted state. It is to be appreciated that although the preferred securement mechanisms 122 are described here, the securement mechanisms 122 may be any other structure that prevents the support bars 112 from sliding from a retracted state.

Figure 3:
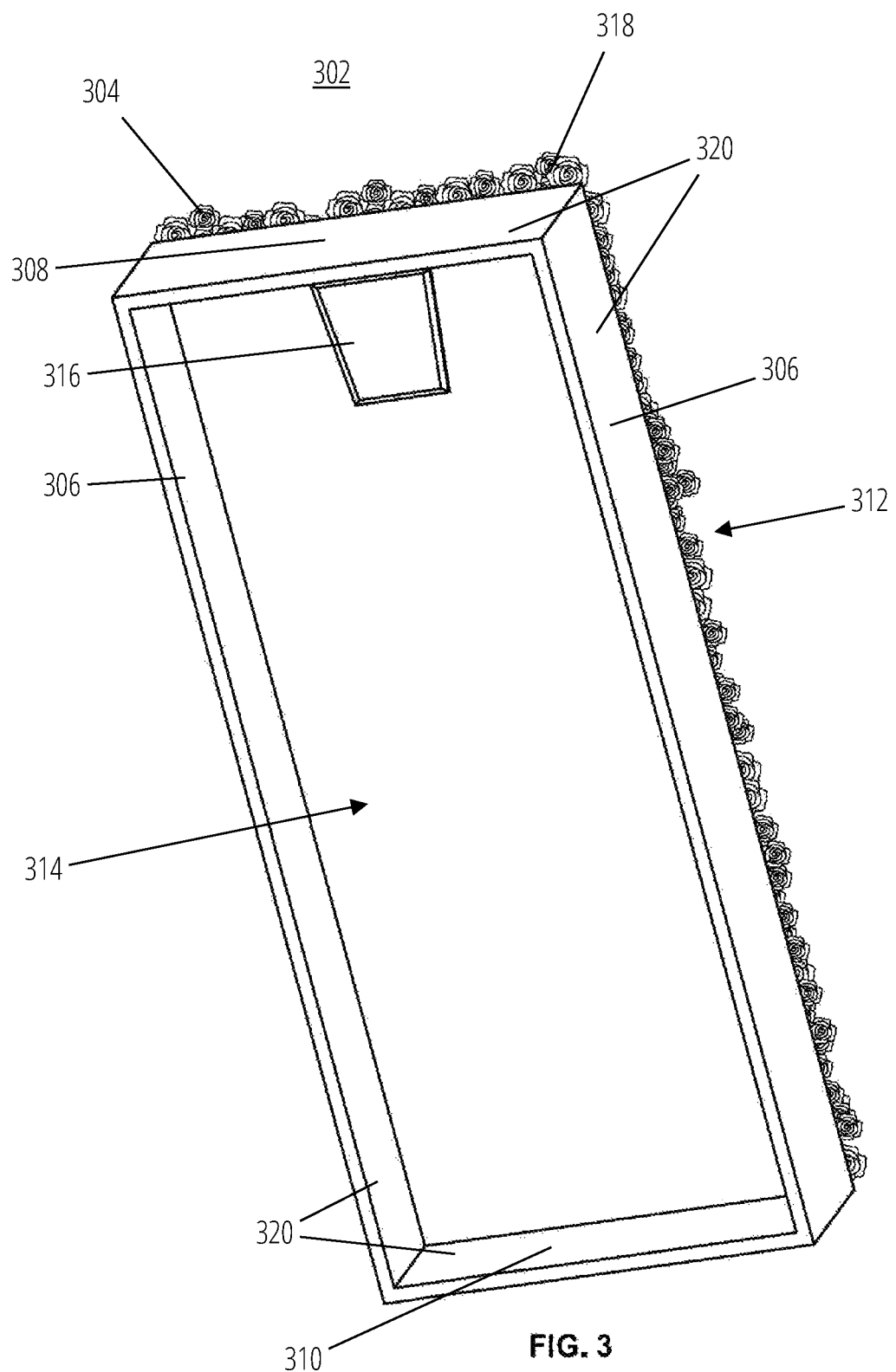
FIG. 3 shows an auxiliary view of a flower panel of the present invention.

FIG. 3 shows a panel 302 of the present disclosure. The panel 302 may include side boards 306, top board 308, a bottom board 310 and a decoration 304. One end of the side boards 306 may be attached to the top board 308. The opposite end of the side boards 306 may be attached to the bottom board 310. In the preferred embodiment, the side boards 306, the top board 308, and the bottom board 310 form a rectangular structure 320, the same size as the support structure 106. In other embodiments, the structure 320 may be a square, trapezoid, triangle, or other shape.

The panel 302 may further include a front 312, a back 314, and a decoration 304. In the preferred embodiment, the decoration 304 is flowers 318. The flowers 318 are designed to attach to the structure 320, and the flowers 318 cover the structure 320 when viewed from the front 312, thereby creating a wall of flowers 318. It is to be appreciated, that although the decoration 304 is described as flowers 318, the decoration 304 may also be a painted panel of wood, drywall, metal, plastic or any other rigid material, patterned tile, wallpaper, or any other decorative material.

The panel 302 may also include an attachment mechanism 316. In the preferred embodiment, the attachment mechanism 316 is a flat rectangular piece of wood, metal, plastic or any other rigid material. In this embodiment, the attachment mechanism 316 may be attached to the center of the top board 308. The attachment mechanism 316 may be attached to the back 314 of the top board 308.

In this embodiment, as shown in FIG. 1B, the support structure 106 includes an attachment channel 132. The attachment channel 132 is attached to the back of the top board 116 near the middle of the top board 116 the attachment channel 132 is piece of wood, metal, plastic, or any other rigid material, with a cut out the same size and shape of the attachment mechanism 316. In another embodiment, the cut out of the attachment channel 132 may be larger than the attachment mechanism 316.

Figure 4A:
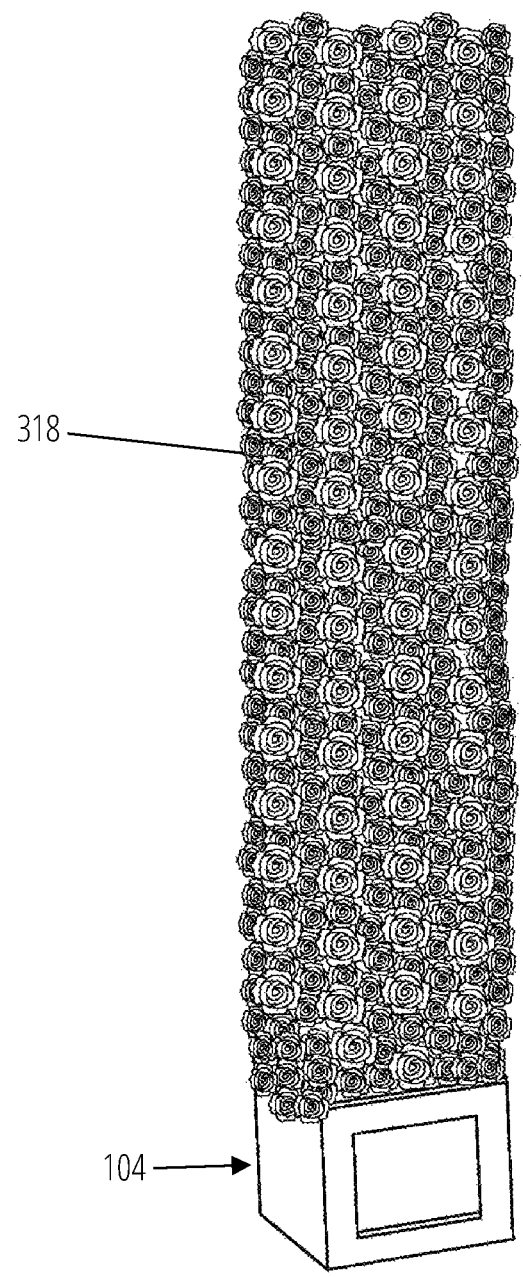
FIG. 4A shows a front view of an embodiment with a panel of the present invention.

FIG. 4A shows the modular wall 102 with the support structure 106 secured to the base 104, and a panel 302 coupled to the support structure 106. In this embodiment, the support structure 106 secures the panel 302 in a vertical position. When viewed from the front, the panel 302 displays the flowers 318.

Figure 4B:
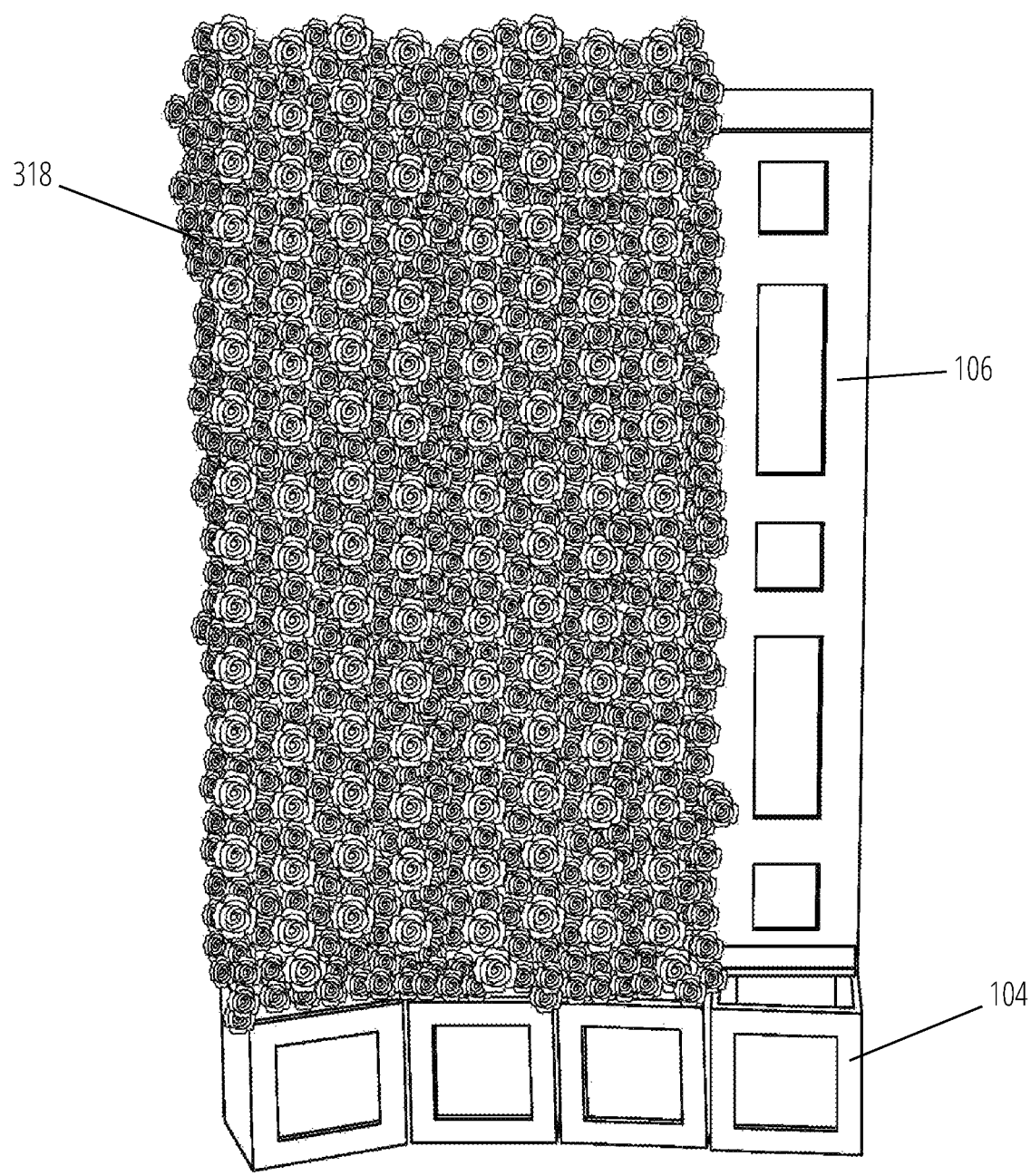
FIG. 4B shows a view of multiple of an embodiment with a panel of the present invention.

As shown in FIG. 4B, multiple modular walls 102 may be coupled together to create a wider display of flowers 318, or any other decoration 304 that may be coupled to the panel 302.

Figure 5:
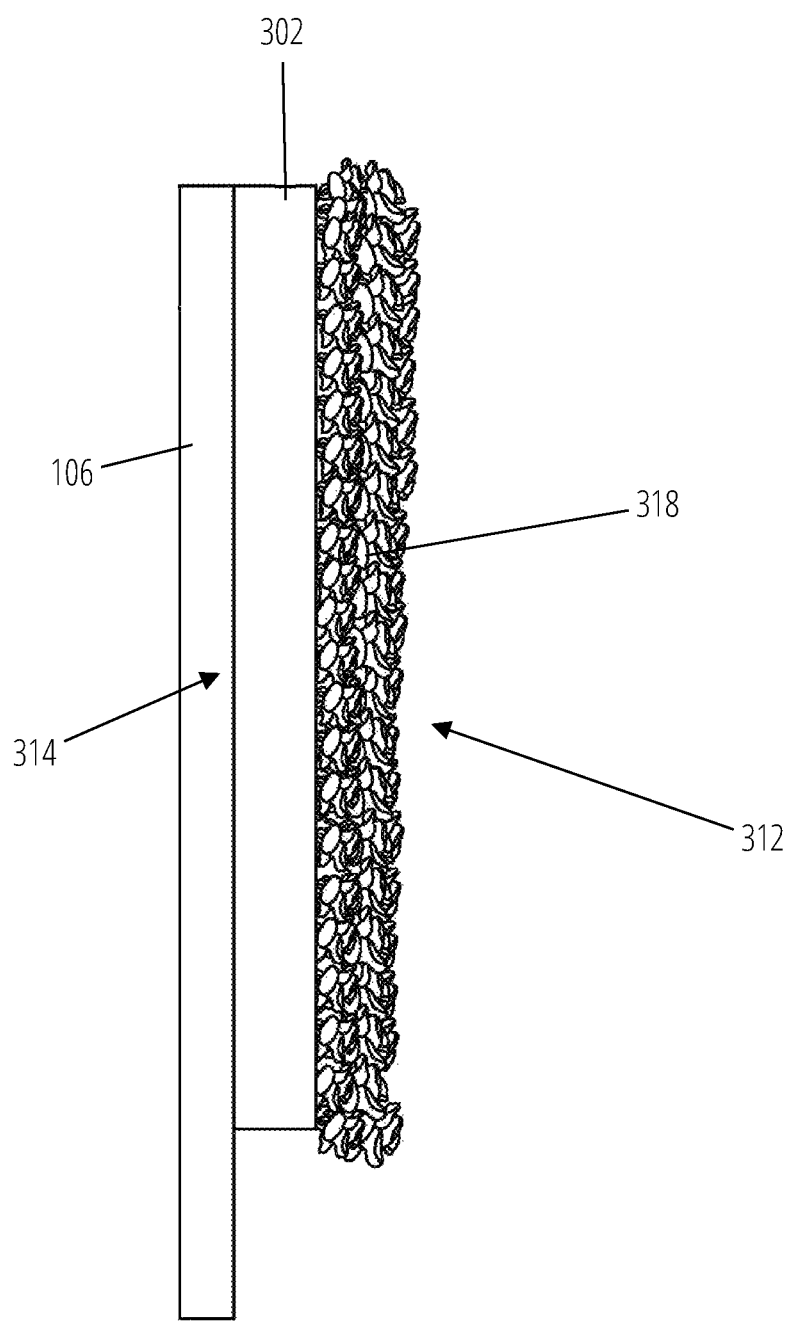
FIG. 5 shows a side view of a panel coupled to a support structure of the present invention.

In the preferred embodiment, as shown in FIG. 5, the panel 302 may be coupled to the support structure 106. When the panel 302 is coupled to the support structure 106, the back 314 of the panel 302 rests against the wall panel 118, and the attachment mechanism 316 goes over the top board 116 and engages the attachment channel 132, thereby securing the panel 302 to the support structure 106. It is to be appreciated that although the panel 302 is described as having one attachment mechanism 316, and the support structure 106 is described as having one attachment channel 132, other embodiments may have more than one attachment mechanism 316 attached to the panel 302, and more than one attachment channel 132 attached to the support structure 106.

In other embodiments, the attachment mechanism 316 may be one half of a Velcro connection, and the attachment channel 132 may be the other half of a Velcro connection. The panel 302 may have multiple attachment mechanisms 316 attached to the structure 320, and the support structure 106 may have multiple attachment channels 132 attached to the side boards 306 and top board 116. In this embodiment, when the panel 302 is coupled to the support structure 106, the attachment channels 132 and the attachment mechanisms 316 interlock removably securing the panel 302 to the support structure 106. It is to be appreciated that the attachment mechanism 316 and the attachment channel 132 may be any mechanism designed to removably secure the panel 302 to the support structure 106.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A modular wall comprising:
   a base, comprising a base panel, sidewalls and at least two support channels, with the sidewalls being coupled to the base panel,
      wherein the base panel and the sidewalls define a recess, and wherein the at least two support channels are located on an inner surface of the sidewalls with one of the at least two support channels being present on each of a set of opposing sidewalls;
   a support structure, comprising a top board, at least two side boards, and at least two support bars, each of the at least two side boards further comprising a top end, a bottom end, and an inner surface,
      wherein the top end of each of the at least two side boards is coupled to the top board, and wherein the at least two support bars are coupled to the inner surface of the side boards; and
   a wall panel, coupled to the support structure,
      wherein the support bars of the support structure are configured to engage the at least two support channels of the base.

2. The modular wall of claim 1, wherein each of the side boards of the support structure further comprise a support channel.

3. The modular wall of claim 2, wherein the at least two support bars of the support structure are configured to slidably engage the support channels of the side boards.

4. The modular wall of claim 2, wherein each of the side boards of the support structure further comprise a securement mechanism configured to secure the support bars of the support structure.

5. The modular wall of claim 1, further comprising a panel removably coupled to the support structure.

6. The modular wall of claim 5, wherein the panel comprises a decoration, a front, and a back, the back of the panel is configured to engage to the wall panel, and the decoration coupled to the front of the panel.

7. The modular wall of claim 5, wherein the decoration of the panel is flowers.

8. The modular wall of claim 6, wherein the support structure further comprises an attachment channel coupled to the top board of the support structure, and the panel comprises a complementary attachment mechanism configured to removably couple to the attachment channel of support structure.

9. A modular wall comprising:
   a base, comprising a base panel, sidewalls and at least two support channels, with the sidewalls being coupled to the base panel, wherein the base panel and the sidewalls define a recess, and wherein the at least two support channels are located on an inner surface of the sidewalls with one of the at least two support channels being present on each of a set of opposing sidewalls;
   a support structure, comprising a top board, at least two side boards, and at least two support bars, with each of the at least two side boards further comprising a top end, a bottom end, and an inner surface,
      wherein the top end of each of the at least two side boards is coupled to the top board, and
      wherein the at least two support bars coupled to the inner surface of the side boards;
   a panel, removably coupled to the support structure; and
   a wall panel, coupled to the support structure,
      wherein the support bars of the support structure are configured to engage the at least two support channels of the base.

10. The modular wall of claim 9, wherein the panel comprises, a decoration, a front, and a back, the back of the panel is configured to engage to the wall panel, and the decoration is coupled to the front of the panel.

11. The modular wall of claim 10, wherein the decoration of the panel is flowers.

12. The modular wall of claim 10, wherein the support structure further comprises an attachment channel coupled to the top board of the support structure, and the panel comprises a complementary attachment mechanism configured to removably couple to the attachment channel of support structure.

13. The modular wall of claim 12, wherein each of the side boards of the support structure further comprise a support channel.

14. The modular wall of claim 13, wherein the at least two support bars of the support structure are configured to slidably engage the support channels of the side boards.

15. The modular wall of claim 14, wherein each of the side boards of the support structure further comprise a securement mechanism configured to secure the support bars of the support structure.

16. A modular wall comprising:
   a base, comprising a base panel, sidewalls and at least two support channels, with the sidewalls being coupled to the base panel,
      wherein the base panel and the sidewalls define a recess, and wherein the at least two support channels are located on an inner surface of the sidewalls with one of the at least two support channels being present on each of a set of opposing sidewalls;
   a support structure, comprising a top board, at least two side boards, at least two support bars, and an attachment channel coupled to the top board, with each of the at least two side boards further comprising a top end, a bottom end, an inner surface and a support channel,
      wherein the top end of each of the at least two side boards is coupled to the top board, and
      wherein the at least two support bars are coupled to the inner surface of the side boards,
      wherein each of the side boards of the support structure further comprise a securement mechanism configured to secure the support bars, and the support bars configured to slidably engage the support channels;
   a panel having, a complimentary attachment mechanism designed to removably couple to the attachment channel of the support structure, flowers, a front, and a back, the back of the panel is configured to engage to the wall panel, and the flowers are coupled to the front of the panel; and
   a wall panel, coupled to the support structure,
      wherein the support bars of the support structure are configured to engage the at least two support channels of the base.

* * * * *